INVENTORS
Charles W. Gordon
Robert G. Tucker

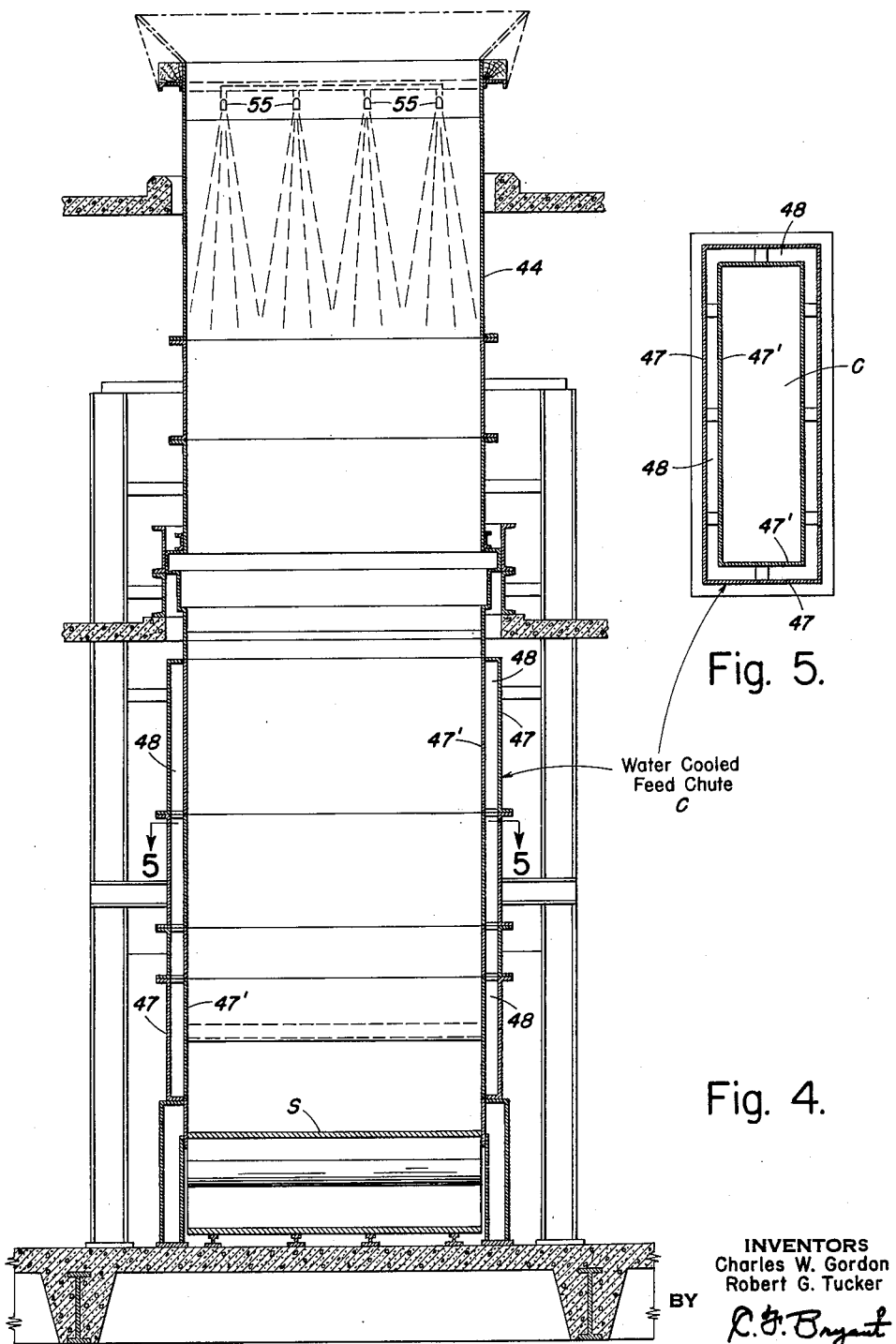

3,031,982
MIXED REFUSE INCINERATOR USING TRAVELING GRATE STOKER AND WATER COOLED FEED CHUTE

Charles W. Gordon, Glen Ellyn, and Robert G. Tucker, Skokie, Ill., assignors to Combustion Engineering, Inc., New York, N.Y., a corporation of Delaware
Filed Aug. 27, 1959, Ser. No. 836,484
2 Claims. (Cl. 110—8)

Our invention relates to incinerator furnace apparatus for drying and burning material typified by mixed city refuse and sewage sludge, and it has special reference to furnaces for such service which utilizes a traveling grate stoker and in which mixed city refuse can be burned either alone or along with dried sewage sludge.

Broadly stated, the object of our invention is to improve and simplify the design of such incinerator furnaces while bettering their performance and eliminating difficulties heretofore encountered.

A more specific object is to provide improved feed chute means for directing the mixed refuse material upon the traveling furnace grate while keeping the temperature of that fed material in the chute well below ignition value.

Other objects and advantages will become apparent from the following description of an illustrative embodiment of the invention when taken in conjunction with the accompanying drawings wherein:

FIG. 4 is a comparable sectional view taken on line 4—4 of FIG. 1 and showing certain constructional details of the new water cooled feed chute which we have provided; and FIG. 5 is a view in section, from line 5—5 of FIG. 1, showing how the feed chute of FIG. 4 is surrounded on all four of its sides by recessed walls through which cooling water flows.

Illustrative Incinerator Furnace With Which Our Invention is Disclosed

Figure 1:
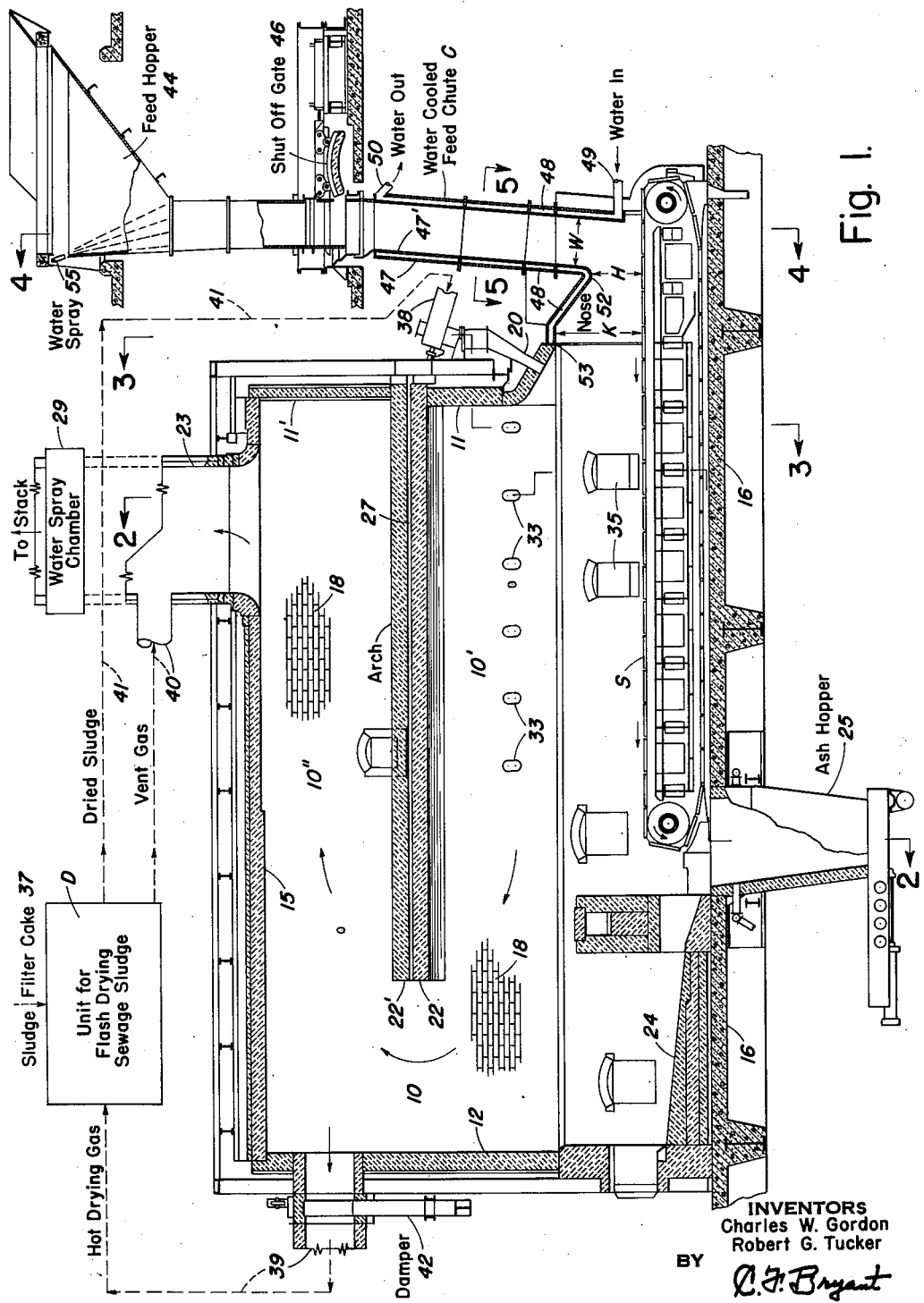
FIG. 1 is a view in sectional elevation of an incinerator furnace wherein our inventive improvements are incorporated.

The improvements of our invention are disclosed by FIG. 1 and the other drawing views as being utilized with an incinerator furnace whose combustion chamber 10 is enclosed by front and rear walls 11—11' and 12 defining the furnace ends, plus left and right walls 13—13' and 14—14' defining the furnace sides, plus a roof wall 15 defining the furnace top, and a foundation floor 16 defining the furnace bottom. Each of these furnace walls may be lined with ceramic brick, designated generally at 18 in FIGS. 1–2.

This furnace utilizes a traveling stoker grate S the upper run of which moves at some appropriate slow speed from right to left in FIG. 1 (see arrows) and the lower run of which returns in the opposite direction, all in well known manner. The mixed refuse material to be burned is introduced upon the right entrance end of said upper run by a feed chute C of novel water cooled design, and such dried sludge as it is desired also to burn is introduced via a series of spouts 20 spaced across the width of grate S between chute C and the furnace front wall 11.

Figure 2:
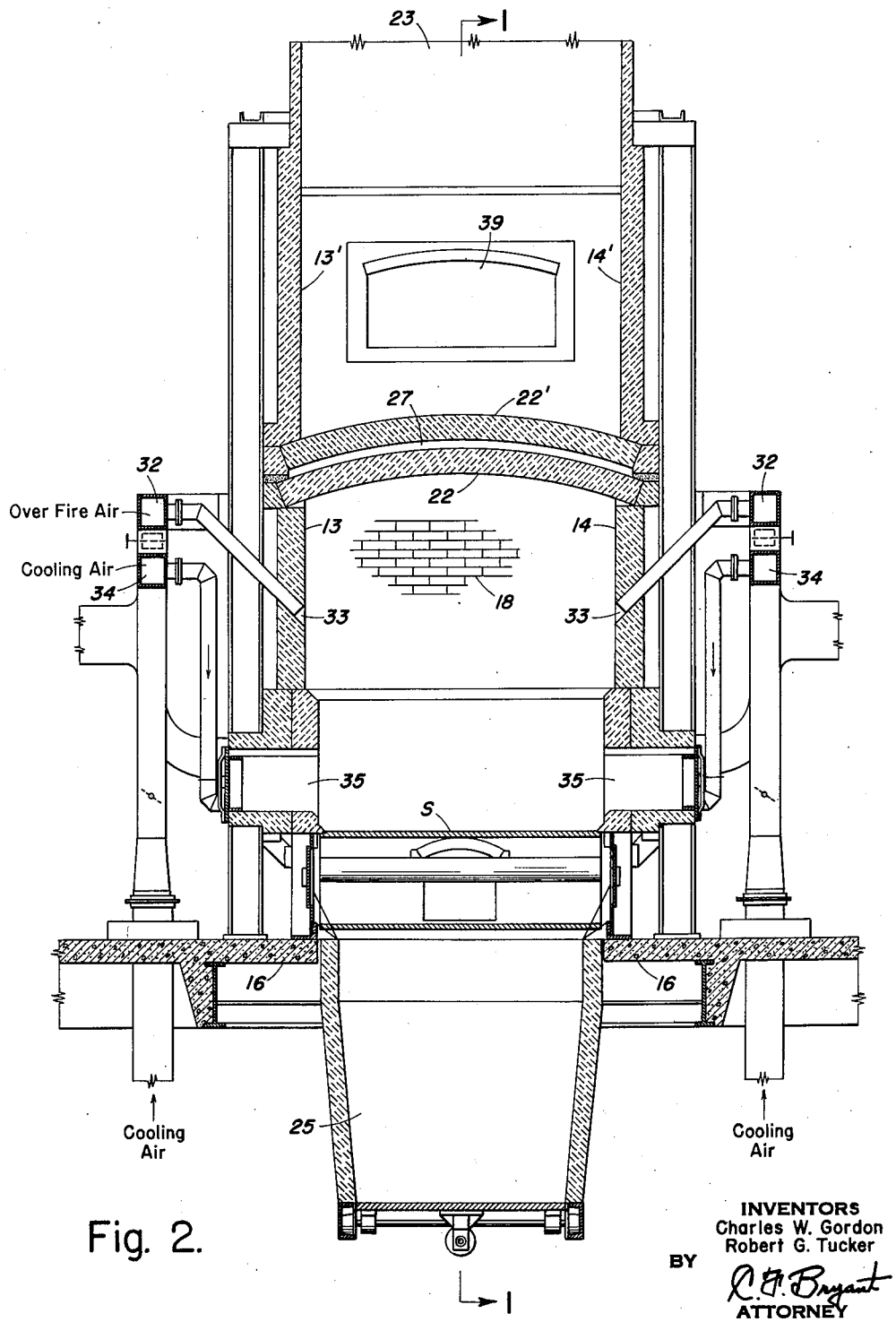
FIG. 2 is a section, taken on line 2—2 of FIG. 1, showing the traveling stoker grate and the furnace arch thereabove and the ash hopper at the grate discharge end and other elements of the complete apparatus.

Extending from said front wall 11—11' back over the entire central and rear portion of traveling grate S is an arch 22—22' bridged as shown by FIGS. 1–2 between the left and right side walls 13 and 14 of the furnace. Combustion gases produced by a burning of the refuse material on grate S are directed by said arch to the furnace rear 10 (left in FIG. 1), and after passing around the arch end these gases flow forwardly above the arch and thence out of the furnace via an exit opening or breeching 23 which leads to a stack or chimney (not shown). Such provision of a burning chamber 10' directly over the traveling grate S plus a combustion chamber 10 at the furnace rear plus a subsistence chamber 10'' directly above the arch 22 results in a very compact furnace unit and one that proves extremely effective in operation.

In flowing successively through these three chambers the products of combustion are required to turn through 180° so that a very substantial amount of floating material drops therefrom to the rear furnace floor 24 from which it can be flushed or raked into the ash hopper 25, as perhaps once per day. Some of the remaining floating material settles on top of the arch 22—22' (at the bottom of the subsistence chamber 10'') from which it may be cleaned at less frequent intervals, as perhaps twice per month.

In the form shown, said arch is formed of lower and upper brickwork or other ceramic layers 22 and 22' that are spaced so as to provide an intervening air channel 27. During operation air from outside the furnace front wall 11—11' enters this space 27 and flows rearwardly therethrough to and out of the back arch end where, after contributing to a cooling of the entire arch length, it enters combustion chamber 10 and aids in the burning out of volatiles in the products of combustion.

Combustion gases leaving the furnace outlet or breeching 23 are carried through a water spray chamber 29 on their way to the stack (not shown), which chamber 29 collects fly ash from those discharge gases by the aid of appropriate water sprays through which the gases pass.

Figure 3:
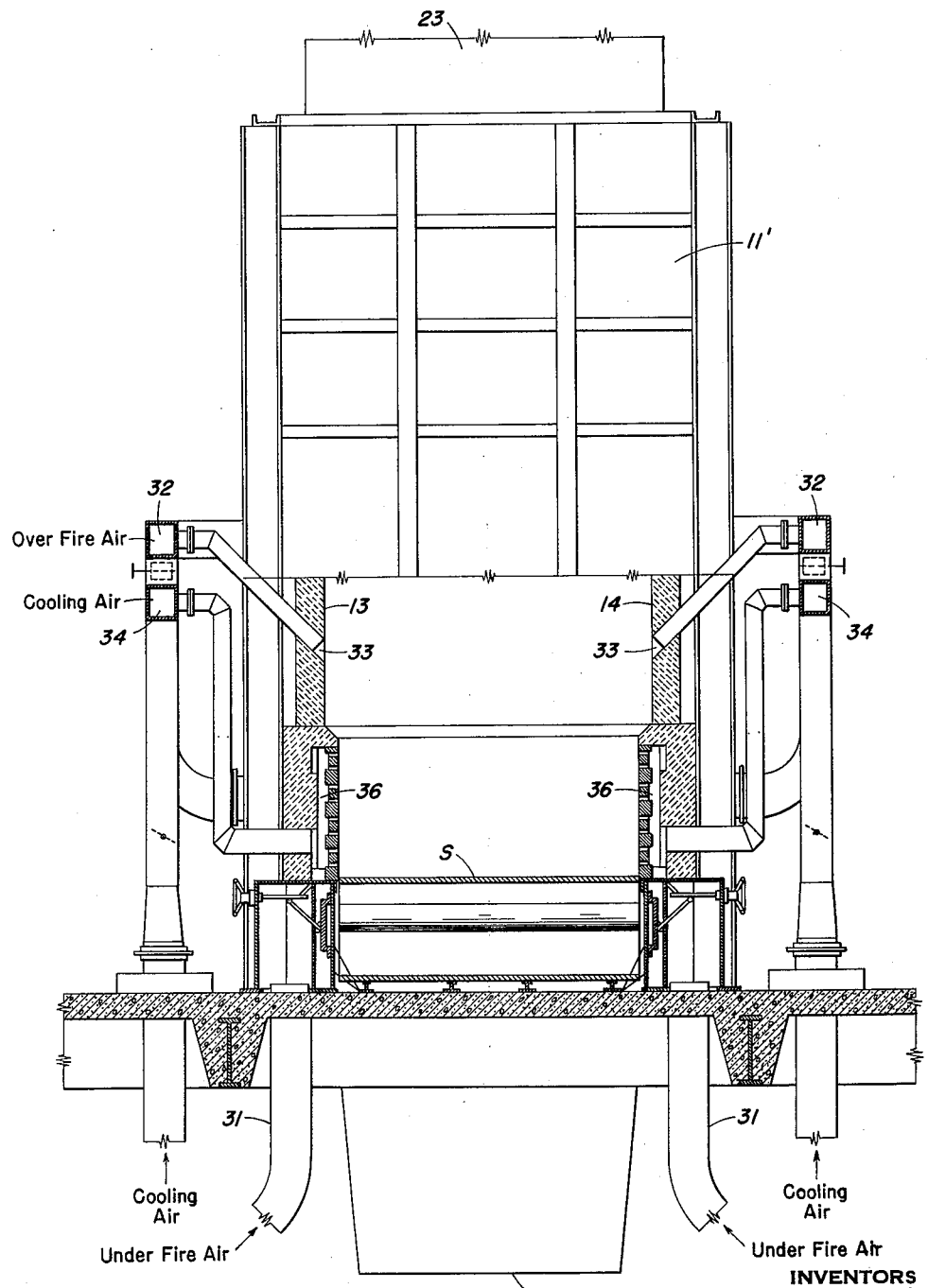
FIG. 3 is a similar section, taken from line 3—3 of FIG. 1, showing the upper furnace front and the lower furnace brickwork by which the traveling grate is surrounded.

The illustrative furnace represented may satisfactorily be designed for operation under natural draft; and in it the traveling grate stoker S at the furnace bottom has the usual forced draft air admitted beneath the upper grate via conventional facilities which FIG. 3 represents as including underfire air ducts 31. This represented furnace also is provided with overfire air ducts 32 which terminate in air admission nozzles 33 disposed along the furnace side walls 13 and 14 over the stoker S in the manner shown. Cooling air from suitable ducts 34 may, if desired, likewise be admitted along the two sides of stoker grate S via openings 35 in the furnace side walls 13—14 after having passed through recesses best shown at 36 in FIG. 3.

Unit for Flash Drying Sewage Sludge

The incinerator furnace here shown is adapted to burn mixed city refuse, fed upon traveling grate S via chute C, either alone or along with dried sewage sludge which may simultaneously be brought into the furnace via the earlier mentioned spouts shown at 20 in FIG. 1. In the system illustrated, such dried sludge comes from a drying unit D and is delivered to spouts 20 via feeders 38.

Said unit D is represented diagrammatically in FIG. 1 and may be of a known form suitable for receiving sludge filter cake at 37 and of comingling it with hot drying gases that are drawn from furnace combustion chamber 10 via a conduit 39. After having performed the drying function within unit D those gases vent via a discharge conduit 40 into the furnace breeching 23 where they are deodorized by mixing with the excess products of combustion from the burning on stoker grate S of the mixed refuse material.

A conduit 41, in the illustrative system represented, carries said dried sludge from unit D to the aforementioned feeders 38 at the furnace front. During operation of this flash drying unit D, a damper 42 in conduit 39 is opened to admit gas from furnace chamber 10 into the unit where those hot gases extract moisture from the incoming sludge filter cake 37 and thence pass to the system stack via conduits 40 and 23. The dried sludge leaving the unit D via conduit 41 passes through feeders 38 and thence into the incinerator furnace spouts 20 over the traveling grate S. The dried sludge so introduced then is burned on said grate along with the mixed city refuse that enters the furnace from a feed hopper 44 via the aforemention feed chute C.

Our New Water Cooled Feed Chute

In an incinerator furnace of the traveling grate type disclosed, the first requirement is that the fuel feed to the stoker S shall be continuous and that the unit shall accept all mixed refuse of reasonable size and do so with a minimum of poking at the feed hopper 44. This requirement has been accomplished by designing the feed chute C so that it has the novel form and character which FIGS. 1, 4 and 5 represent.

Interposed between the said hopper 44 that receives the mixed city refuse and said chute C is a shut-off gate 46 which normally occupies the open position of FIG. 1. At proper times this gate 46 can be closed, and thus act as a safety device in the event the material inside the chute catches on fire through operating carelessness or for other unforeseen reason.

To minimize the likelihood of such fire we make all four walls of our chute C of the represented double construction 47—47' that provides a space 48 which surrounds the chute on all four sides and into an through which space cooling water may be circulated. In the arrangement shown by FIG. 1 such cooling water may come into said space 48 via a lower inlet 49 and then leave the space via an upper outlet 50. Such water assures that the mixed refuse material in chute C will at all times be kept well below the ignition temperature, and thus contributes to the proper and safe functioning of the incinerator furnace apparatus.

Also of real significance is the unique shaping and proportioning of this feed chute C which FIG. 1 represents and which has resulted from months of painstaking experiment and trial on our part. Such experiment and later successful operation have confirmed our earlier theory that, when the chute width as shown by FIG. 4 spans the width of grate S, the distance H between the grate top and the chute nose 52 should have a value equal to or slightly greater than the inside front-to-back dimension W of the chute. In practice we find it advantageous to make these two dimensions equal; and in the operative installation upon which the drawings hereof are based, each of these two dimensions H and W has the value of 2 ft. 3 in.

Coordinating with said two dimensions H and W is a third and major dimension marked K in FIG. 1. In the illustrative installation referred to this third dimension K has a value of 4 feet and designates the distance from the top of grate S to the top of the chute outlet. This increase of K over H results from the represented upwardly slanting of the chute top wall from nose 52 to the junction of that upper wall with the refractory 53 at the furnace front. While a slant of the order of between 35 and 40° has been shown, it will be understood that other slant angles likewise are usable.

Among the factors behind our special chute shaping just described, mention may be made of the following. If the dimension H is made less than dimension W the refuse material coming down through chute C compresses when passing under the nose 52 and then expands beyond the nose to a depth of fuel bed on traveling grate S which in actual practice cannot ve burned out successfully. And if dimension H is made greater than dimension W, again the material cannot be burned out in traveling the length of the stoker S unless that length is extended far beyond the limits which are commercially acceptable. Hence, making of these two dimensions H and W substantially the same has been found by us to give the best results.

Moreover, the upward slanting of the chute top wall from nose 52 to point 53 has been found by us to be necessary due to the fact that the refuse material starts to burn on the traveling grate S very shortly after it passes under the nose 52. With the upward expansion thus provided, the gases of combustion are drawn into the furnace burning chamber 10'; but were this expansion not to be provided, the smoke would tend to pass reversely back towards and into the chute C, and thence up through the material in the chute in the event same was not compacted.

Our new chute design here shown and described eliminates all difficulties such as the foregoing and results in a complete incinerator furnace which operates with great success. It also permits the total length of traveling grate stoker S to be kept within limits which are thoroughly practical and which keep the total furnace length correspondingly low and economical. Thus in the illustrative installation upon which the drawings hereof are based, said traveling stoker grate S has a length of about 32 ft. and is 8 ft. wide; the indcinerator furnace which includes said stoker is about 48 ft. long and 24 ft. tall; and such furnace, when equipped with the improvements of our invention, is capable of burning 150 tons of city refuse plus dried sewage sludge during each 24 hour day.

How the Complete Incinerator Apparatus Operates

The mixed refuse, from a typical community today, includes a preponderance of paper. This comes about from the widespread use of frozen foods and the like, plus the use of kitchen garbage grinders; wherefore the amount of so-called "green" garbage is now only a fraction of that experienced in former years.

When the paper content of such mixed refuse is burned, the ascending hot gases carry out burned paper particles which vary widely in size and in the extreme may be several inches square; if these particles were allowed to escape from the stack they would create considerable nuisance over a wide area; and it is therefore necessary to knock down these paper particles before they escape from the stack.

In our improved furnace this is accomplished in part by the 180° direction reversal in combustion gas flow from burning chamber 10' through combustion chamber 10 and thence through subsistence chamber 10", and in remaining part by the water spray device 29 which is installed in the stack entrance.

In feeding such mixed refuse into the hopper 44 we find it further advantageous to subject same to a preliminary water spray which may originate in jets such as are shown at 55 in FIGS. 1 and 4. The resultant spraying of the fed refuse material makes it less likely to smoulder or catch on fire during downward passage through said chute C.

Moreover, the action of the surrounding water jacket 48 of feed chute C maintains the temperature of such downwardly passing refuse well below the ignition value and thus further safeguards against burning of the material until after same has been delivered upon traveling stoker grate S inside the furnace. And the special chute shaping and design earlier explained assures satisfactory and uninterrupted delivery of the mixed refuse upon the traveling grate S and entry therewith into the furnace. If desired, as already explained, the burning of such mixed refuse which thereupon takes place on the traveling grate S may be accompanied by entry of dried sewage sludge through feed spouts 20 and a burning of that sludge on top of and along with the bed of said mixed refuse.

Our improved incinerator furnace as here disclosed thus is capable of satisfactorily burning the mixed refuse from said chute C either alone or in combination with dried sludge added on top thereof. The advantage of combined burning, as here illustratively shown, lies in utilizing the incinerator furnace as the source of hot drying gas for the sludge unit D and in mixing the noxious vent gases from that unit with the stack gas from the furnace with accompanying deodorization of all those vent gases.

Our inventive improvements are therefore capable of wide application and extensive practical use; and while we have illustrated and described a preferred embodiment of our novel organization it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. In an incinerator furnace having front, rear, top, and side walls for burning mixed refuse from city homes and the like, a traveling grate stoker which extends into the lower part of said furnace through a substantially vertical front furnace wall from a point external to that wall and which has an upper grate run, a refuse feed chute which is disposed over and extends upwardly from an area of the said upper grate run that is outside of said furnace wall, said feed chute comprising four walls, a gate which when moved to its closed position closes off the passage formed by the four chute walls, said feed chute including inner and outer walls which are generally parallel and respectively adjacent to and remote from the front furnace wall, said four walls of said feed chute being provided with passages therethrough, and means for circulating through said passages a cooling fluid such as water by which the temperature of the refuse filling the chute and passing downwardly therethrough is kept well below the ignition value of such refuse, a feed hopper positioned above said chute and arranged to drop refuse material thereinto for passage by gravity through the chute and downwardly upon the upper grate run thereebeneath, means for moving said upper grate run in a direction from said chute towards the furnace with resultant carrying into the furnace of the said refuse material which the chute delivers upon the grate, the inner chute wall having a lower end that bends inwardly towards the furnace and also upwardly to form a nose which is spaced above the upper grate run surface by a distance at least as great as the inside spacing between the inner and outer chute walls, whereby refuse material entering the furnace from the chute can pass with the moving grate freely beneath said nose and then have room therebeyond for upward expansion into a bed of increased thickness on the grate as the refuse starts to burn, an arch lying in a generally horizontal plane above said grate and extending from said front furnace wall rearwardly into the furnace interior to a point spaced from the rear wall of the furnace but beyond the end of the traveling grate stoker, said arch also extending clear across the furnace from one side wall to the other, means in the arch providing a passage which extends through the arch from front to rear, means placing the front end of said passage in communication with the atmosphere outside the furnace whereby air entering at said front end can flow rearwardly through the passage and out thereof into the furnace at the arch rear with an accompanying cooling effect on the arch during furnace operation, and an outlet in the top wall of said furnace located near the front wall, through which the combustion gases can be exhausted from said furnace.

2. An incinerator furnace apparatus as defined by claim 1 wherein supplemental feed spouts are provided at the furnace front over said traveling stoker grate and between said refuse feed chute and the furnace, a unit for flash drying sludge filter cake organized to receive hot gases from said furnace and to comingle those gases with incoming filter cake so as to convert the same into dried sludge by removing the moisture therefrom, means for conveying said dried sludge to said supplemental feed spouts and thence into the recited furnace for burning therein on said traveling grate along with the refuse material from said feed chute, and means for conveying the vent gases from said flash drying unit into the combustion gases that pass out of the recited furnace on their way to a stack.

References Cited in the file of this patent

UNITED STATES PATENTS

| | | |
|---|---|---|
| 833,091 | Simonds | Oct. 9, 1906 |
| 1,136,033 | Morrison | Apr. 20, 1915 |
| 1,627,715 | Stowe | May 10, 1927 |
| 1,659,564 | Duncan | Feb. 21, 1928 |
| 1,859,300 | Krenz | May 24, 1932 |
| 2,045,115 | Allen et al. | June 23, 1936 |
| 2,340,431 | Satchwell | Feb. 1, 1944 |

FOREIGN PATENTS

| | | |
|---|---|---|
| 323,770 | Germany | May 11, 1917 |